(12) United States Patent
Munafo et al.

(10) Patent No.: US 10,678,955 B2
(45) Date of Patent: Jun. 9, 2020

(54) TECHNOLOGIES FOR SECURE INPUT/OUTPUT DEVICE ACTIVATION

(71) Applicant: Intel Corporation, Santa Clara, CA (US)

(72) Inventors: Tamir Damian Munafo, Har-Hotzbim (IL); Rafi Davidovich, Modiin (IL)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 15/188,289

(22) Filed: Jun. 21, 2016

(65) Prior Publication Data

US 2017/0364712 A1 Dec. 21, 2017

(51) Int. Cl.
*G06F 21/00* (2013.01)
*G06F 21/83* (2013.01)
*G06F 21/84* (2013.01)

(52) U.S. Cl.
CPC .............. *G06F 21/83* (2013.01); *G06F 21/84* (2013.01)

(58) Field of Classification Search
CPC ................................ G06F 21/83; G06F 21/84
See application file for complete search history.

(56) References Cited

U.S. PATENT DOCUMENTS

| 8,458,301 | B1* | 6/2013 | Andrus | H04L 41/0816 |
| | | | | 709/220 |
| 2006/0176271 | A1* | 8/2006 | Polivy | G06F 1/1613 |
| | | | | 345/156 |
| 2014/0033316 | A1* | 1/2014 | Paczkowski | G06F 21/74 |
| | | | | 726/26 |
| 2015/0363613 | A1* | 12/2015 | O'Dowd | G06F 21/83 |
| | | | | 726/23 |
| 2016/0337165 | A1* | 11/2016 | Mujtaba | H04W 52/0251 |
| 2017/0019872 | A1* | 1/2017 | Yang | H04L 61/2069 |
| 2019/0056959 | A1* | 2/2019 | Piwonka | G06F 7/504 |

* cited by examiner

*Primary Examiner* — Kendall Dolly
(74) *Attorney, Agent, or Firm* — Barnes & Thornburg LLP

(57) ABSTRACT

Technologies for secure input/output device activation include a compute device to identify an attempt to activate an input/output device of the compute device, notify a controller of the compute device of the attempt to activate the input/output device via a communication channel that is out-of-band relative to an operating system of the compute device, determine whether to authorize activation of the input/output device based on a security policy, and allow the input/output device to resume activation in response to a determination that the security policy authorizes the activation. The security policy indicates whether one or more applications are authorized to access the input/output device.

25 Claims, 4 Drawing Sheets

TECHNOLOGIES FOR SECURE INPUT/OUTPUT DEVICE ACTIVATION

BACKGROUND

The vast majority of today's computing devices such as personal computers, tablets, and smartphones include advanced user-facing and world-facing cameras, various microphones, and potentially various other input/output (I/O) devices. Although such devices generally enhance the user's experience and increasingly offer users advanced capabilities in quite small form factors, the presence of such input/output devices opens a new attack surface for hackers and/or spyware (e.g., to monitor the user in his or her surroundings without the user's knowledge). For example, a hacker may gain unauthorized access to a camera or microphone of a particular computing device through an application installed by the user or by virtue of various viruses or rogue software. It should be appreciated that unauthorized access to input/output devices may have a major impact on a user's privacy and potentially grievous security implications in the context of an enterprise or military environment. Although some software-based mechanisms exist to reduce such hacking, software-based solutions are prone to compromise by other software agent or viruses, are frequently disabled, and are generally useless when a particular device is in a low-power or sleep state.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
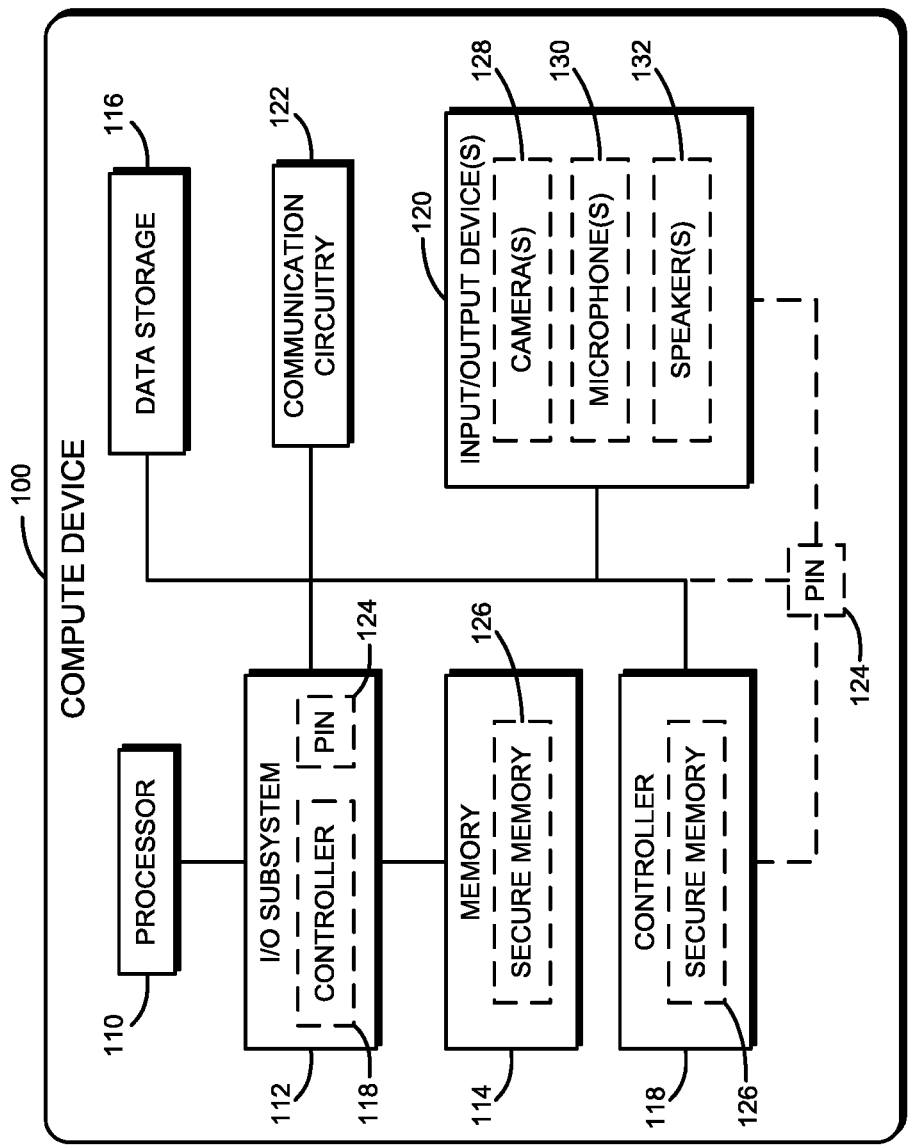
FIG. 1 is a simplified blow diagram of at least one embodiment of a compute device for secure input/output device activation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for secure input/output device activation is shown. As described in detail below, the compute device 100 utilizes a hardware-based solution to improve input/output device security that may allow the user to control the particular applications that are authorized to access a particular input/output device of the compute device 100. In the illustrative embodiment, the compute device 100 utilizes techniques that are out of the operating system and software context, which makes those techniques more secure and less prone to attacks than software-based security mechanisms. More specifically, in some embodiments, the compute device 100 may monitor one or more cameras, microphones, and/or other input/output devices of the compute device 100 for activation attempts (e.g., by an application). If an input/output device has been activated (or an attempted activation), a controller 118 of the compute device 100 may be notified via an out-of-band communication channel (i.e., out of the OS context) and may determine whether to authorize the activation based on a security policy 212 and/or user input. It should be appreciated that, in some embodiments, a hacker may attempt to activate a particular I/O device 120 while the compute device 100 is in a low-power or sleep state. In the illustrative embodiment, the hardware-based security techniques described herein allow the user and/or the controller 118 to be notified of an attempted activation or access of an I/O device 120 even if the compute device 100 is in such a low-power or sleep state. As such, it should be appreciated that the techniques described herein may apply equally well regardless of the power state (e.g., Sx or S0ix) of the compute device 100.

The compute device 100 may be embodied as any type of computing device or system capable of performing the functions described herein. For example, in some embodiments, the compute device 100 may be embodied as a desktop computer, laptop computer, tablet computer, notebook, netbook, Ultrabook™, smartphone, cellular phone, wearable computing device, personal digital assistant, mobile Internet device, smart device, server, router, switch, Hybrid device, and/or any other computing/communication device. As shown in FIG. 1, the illustrative compute device 100 includes a processor 110, an input/output ("I/O") subsystem 112, a memory 114, a data storage 116, a controller 118, one or more I/O devices 120, and a communication circuitry 122. Additionally, in some embodiments, the compute device 100 may include an electrical pin 124 electrically coupled to the controller 118 and the I/O device(s) 120 and out-of-band relative to the operating system executed by the processor 110. Of course, the compute device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the compute device 100 such as operating systems, applications, programs, libraries, and drivers. As shown, in some embodiments, the memory 114 may include a secure memory 126 to store, for example, a security policy 212 and/or other suitable data. The memory 114 is communicatively coupled to the processor 110 via the I/O subsystem 112, which may be embodied as circuitry and/or components to facilitate input/output operations with the processor 110, the memory 114, and other components of the compute device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the compute device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the compute device 100 as described herein.

The controller 118 may be embodied as any hardware component(s) or circuitry capable of performing the functions described herein. For example, in some embodiments, the controller 118 may be embodied as a Converged Security and Manageability Engine (CSME), a Trusted Platform Module (TPM), a security engine, or an out-of-band processor. Depending on the particular embodiment, the controller 118 may be a standalone device or may form a portion of the I/O subsystem 112 and/or other component(s) of the compute device 100. As described herein, the controller 118 may establish an out-of-band communication link/channel with the I/O device(s) 120. For example, in some embodiments, the controller 118 may be electrically coupled to the I/O device(s) 120 via the electrical pin 124. In particular, in the illustrative embodiment, the controller 118 is electrically coupled to the I/O device(s) 120 via one or more general purpose input/output (GPIO) pins. For example, each I/O device 120 may be electrically coupled to and correspond with a different GPIO pin or other pin 124. It should be appreciated that the electrical pin 124 may be associated with one or more registers that may store data based on, for example, a voltage or current supplied to the electrical pin 124. For example, in some embodiments, a register may store a value of "1" if a "high" voltage is supplied to the electrical pin 124 and store a value of "0" if a "low" or zero voltage is supplied to the electrical pin 124.

The I/O devices 120 may include any number of devices for allowing data input and/or data output. For example, in some embodiments, the I/O devices 120 may include one or more input devices such as cameras 128 and/or microphones 130 and/or one or more output devices such as speakers 132. Depending on the particular device 120, a particular I/O device 120 may be configured to only receive data input, the I/O device 120 may be configured to only provide data output, or the I/O device 120 may be configured to both receive data input and provide data output. It should be appreciated that the particular devices 120 included in the compute device 100 may depend on, for example, the type and/or intended use of the compute device 100.

The communication circuitry 122 may be embodied as any communication circuit, device, or collection thereof, capable of enabling communications between the compute device 100 and other remote devices over a network. The communication circuitry 122 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

Figure 2:
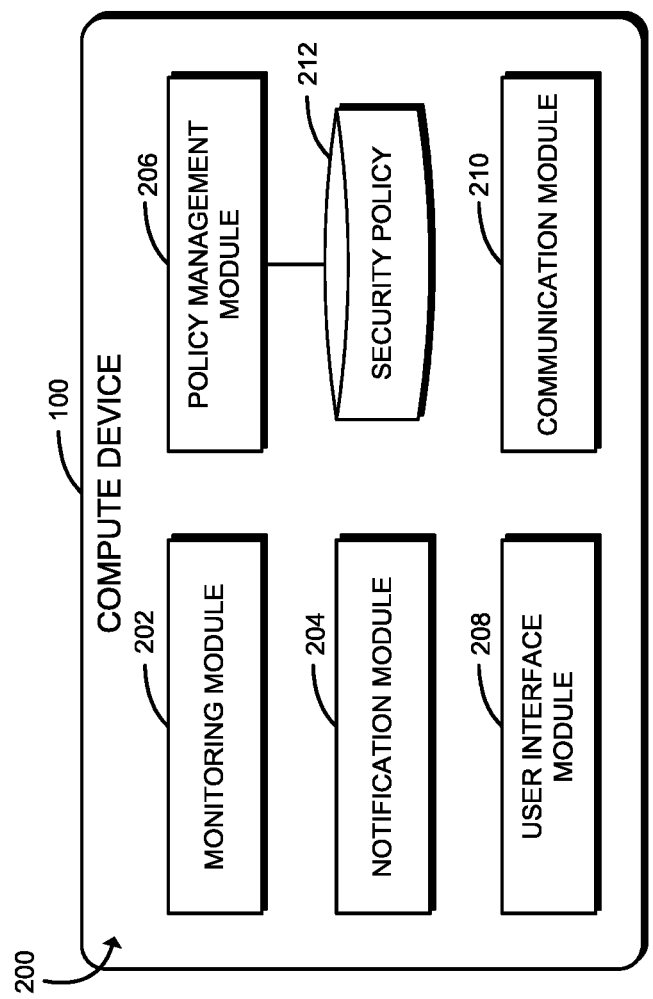
FIG. 2 is a simplified block diagram of at least one embodiment of an environment of the compute device of FIG. 1.

Referring now to FIG. 2, in use, the compute device 100 establishes an environment 200 for secure input/output device activation. The illustrative environment 200 includes a monitoring module 202, a notification module 204, a policy management module 206, a user interface module 208, and a communication module 210. The various modules of the environment 200 may be embodied as hardware, software, firmware, or a combination thereof. For example, the various modules, logic, and other components of the environment 200 may form a portion of, or otherwise be established by, the processor 110 or other hardware components of the compute device 100. As such, in some embodiments, one or more of the modules of the environment 200 may be embodied as circuitry or collection of electrical devices (e.g., a monitoring circuitry, a notification circuitry, a policy management circuitry, a user interface circuitry, and/or a communication circuitry). It should be appreciated that, in such embodiments, one or more of the monitoring circuitry, the notification circuitry, the policy management circuitry, the user interface circuitry, and/or the communication circuitry may form a portion of one or more of the processor 110, the I/O subsystem 112, the memory 114, the data storage 116, the controller 118, the I/O devices 120, and/or the communication circuitry 122. Additionally, in some embodiments, one or more of the illustrative modules may form a portion of another module and/or one or more of the illustrative modules may be independent of one another.

The monitoring module 202 is configured to monitor an I/O device 120 and/or parameters or components associated with the activation of the I/O device 120 for attempts by a software or firmware application to activate or otherwise access the I/O device 120. Depending on the particular embodiment, the monitoring module 202 may form a portion of the particular I/O device 120 or may form a portion of another component of the compute device 100. Further, in some embodiments, the monitoring module 202 and the notification module 204 may perform the various functions described herein simultaneously and, therefore, may be embodied as the same module. For example, in some embodiments, the compute device 100 may assert a GPIO pin or other electrical connection when a particular I/O device 120 has been accessed or activated, which may serve as a mechanism to both identify the attempt to activate the I/O device 120 and notify the controller 118 of the activation attempt.

As indicated above, the notification module 204 is configured to notify the controller 118 of the attempt to activate or otherwise access the I/O device 120 and may do so via an out-of-band communication channel (i.e., a communication channel that is out-of-band relative to the operating system of the compute device 100). For example, the notification module 204 may notify the controller 118 via an out-of-band electrical connection such as the electrical pin 124 (e.g., a GPIO pin). Further, in some embodiments, the notification module 204 may determine the application (e.g., an application executing within the OS context) that prompted the attempt to activate the I/O device 120 and notify the controller 118 of the identity of that application. For example, in some embodiments, each application may be associated with a unique identifier (e.g., a globally unique identifier (GUID)) that may be used to identify the accessing application. Of course, it should be appreciated that an application may be identified in any other suitable way in other embodiments.

The policy management module 206 is configured to handle the management and enforcement of a security policy 212 of the compute device 100. In particular, the policy management module 206 determines whether to authorize activation of I/O devices 120 based on the security policy 212. If the security policy 212 authorizes the activation, the policy management module 206 allows the corresponding I/O device 120 to resume activation, whereas if the security policy 212 does not authorize the activation, the policy management module 206 may prevent the I/O device 120 from resuming activation. As described below, the policy management module 206 may convey the authorization or un-authorization of the application to access a particular I/O device 120 via the GPIO pin 124 (e.g., by de-asserting the GPIO pin 124 or failing to de-assert the GPIO pin 124).

In the illustrative embodiment, the security policy 212 may be stored in the secure memory 126 and indicates whether one or more applications (e.g., software and/or firmware applications) are authorized to access one or more I/O devices 120. For example, in some embodiments, the security policy 212 may store a list of unique identifiers of applications that are authorized to access a particular I/O device 120 and/or a list of unique identifiers of applications that are not authorized to access the I/O devices 120. In some embodiments, if a particular application is not identified in the security policy 212, the compute device 100 may prompt the user (e.g., via the user interface module 208) to provide input regarding whether to authorize activation of the I/O device 120 by that application or to deny the activation. Further, the compute device 100 may store the user's response in the security policy 212 for subsequent use. It should be appreciated that each of the I/O devices 120 may be governed by the same rules or different rules depending on the particular embodiment. For example, in some embodiments, each I/O device 120 may have a separate security policy 212 or a separate set of rules defined in the security policy 212.

The user interface module 208 is configured to allow the user of the compute device 100 to interact with the compute device 100. In some embodiments, the user interface module 208 permits out-of-band communication between the compute device 100 (e.g., the controller 118) and the user over one or more I/O devices 120. For example, as described herein, in some embodiments, the user interface module 208 may prompt the user whether a particular application is authorized to access/activate a particular I/O device 120.

The communication module 210 handles the communication between the compute device 100 and other computing devices over a network. For example, in some embodiments, the communication module 210 may transmit the security policy 212 to a remote device (e.g., for a large-scale security analysis).

Figure 3:
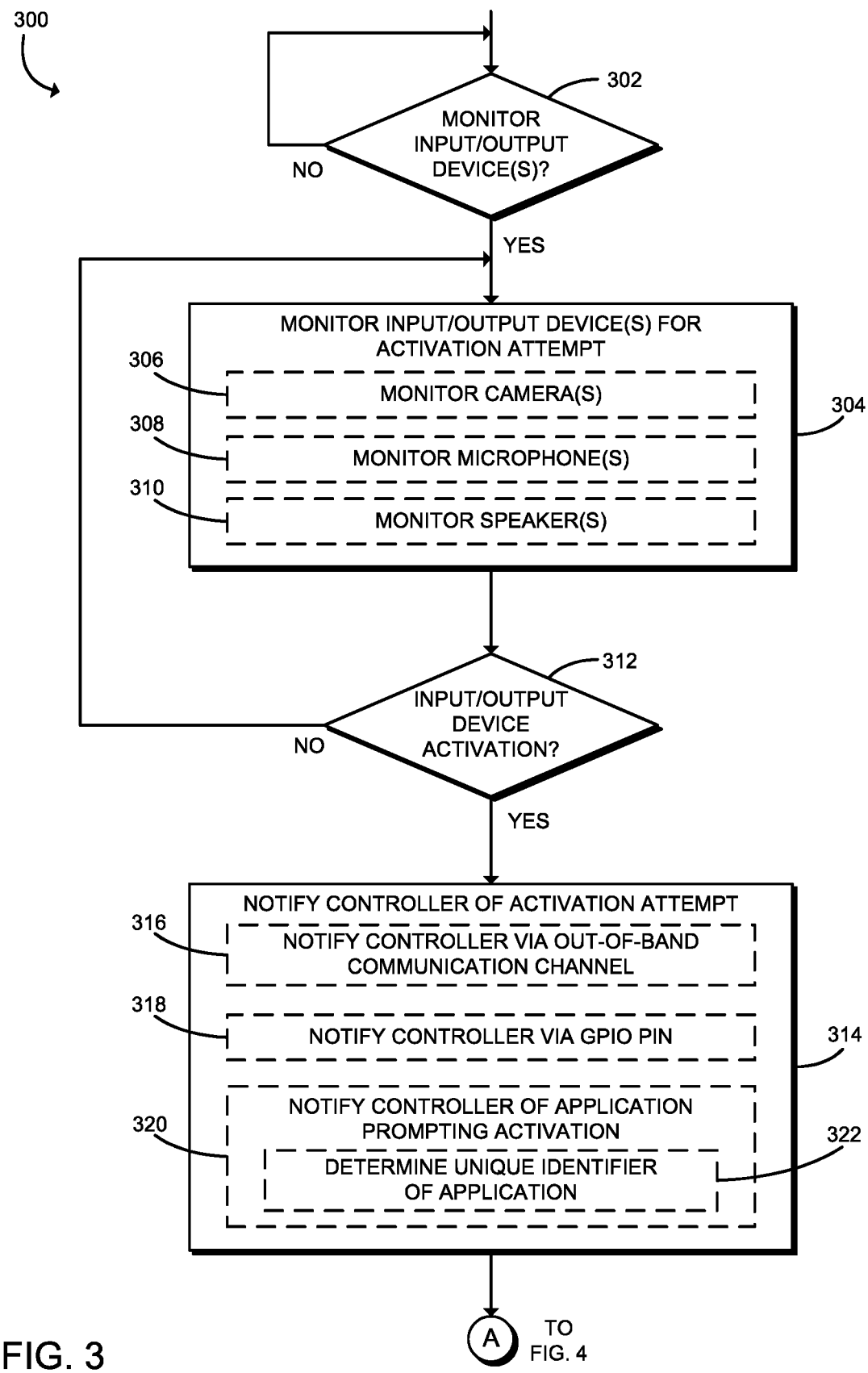
FIGS. 3-4 is a simplified flow diagram of at least one embodiment of a method for secure input/output device activation that may be executed by the compute device of FIG. 1.
Figure 4:
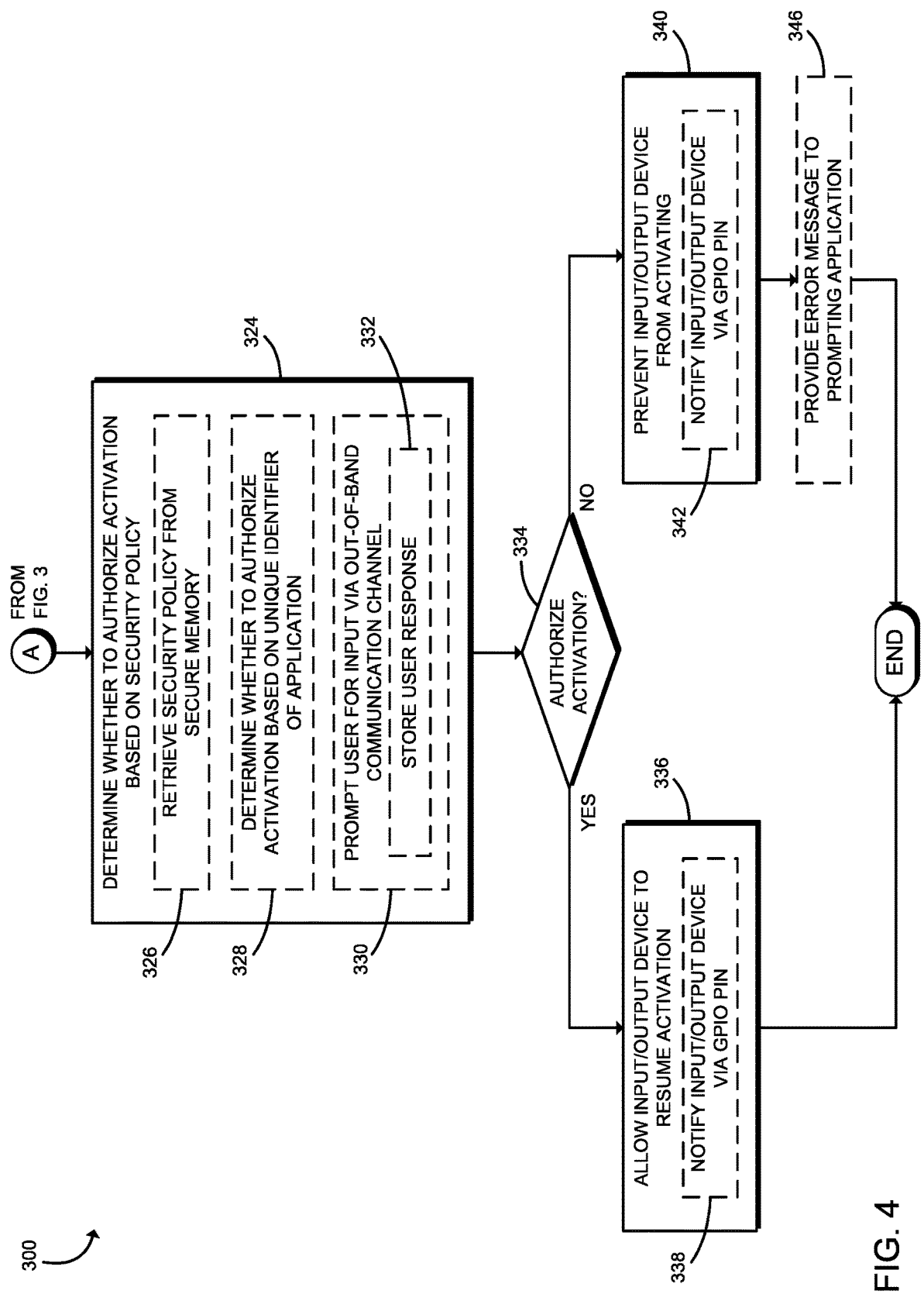

Referring now to FIGS. 3-4, in use, the compute device 100 may execute a method 300 for secure input/output device activation. It should be appreciated that, in some embodiments, the techniques of the method 300 may be executed by one or more of the modules of the environment 200 of the compute device 100 as shown in FIG. 2. As indicated above, it should be further appreciated that the method 300 may be executed regardless of the power state (e.g., Sx or S0ix) of the compute device 100. The illustrative method 300 begins with block 302 of FIG. 3 in which the compute device 100 determines whether to monitor one or more I/O devices 120. If so, the method 300 advances to block 304 in which the compute device 100 monitors the I/O devices 120 for an activation/access attempt by a software or firmware application. For example, the compute device 100 may monitor one or more cameras 128 in block 306, the compute device 100 may monitor one or more microphones 130 in block 308, and/or the compute device 100 may monitor one or more speakers 132 in block 310. It should be appreciated that the compute device 100 may utilize any suitable technique or mechanism for identifying when an application has attempted to access activate an I/O device 120. Although the compute device 100 may monitor for access or activation attempts of multiple I/O devices 120 simultaneously, it should be appreciated that the compute device 100 may be described herein as monitoring access/ activation attempts of a single I/O device 120 for simplicity and clarity of the description. However, it will be appreciated that the techniques described herein apply equally well to the monitoring of multiple I/O devices 120.

In block 312, the compute device 100 determines whether an I/O device 120 activation/access has been attempted. If not, the method 300 returns to block 304 in which the compute device 100 continues to monitor for such activation/access attempts. However, if an attempt to activate/ access the I/O device 120 has been identified, the compute device 100 notifies the controller 118 of the activation/ access attempt. In particular, in block 316, the compute device 100 or, more specifically, the I/O device 120 or management module of that I/O device 120 may notify the controller 118 of the activation/access attempt via an out-of-band communication channel (i.e., out-of-band relative to the OS of the compute device 100). More specifically, in block 318, the controller 118 may be notified of the activation attempt via a GPIO pin 124 or other out-of-band electrical connection between the controller 118 and the I/O device 120 (or I/O management device/module). Further, in block 320, the compute device 100 may notify the controller 118 of the application that prompted the activation of the I/O device 120 (i.e., the application that attempted to activate/access the I/O device 120). In doing so, in block 322, the compute device 100 may determine a unique identifier of the application. For example, in some embodiments, each application may be associated with a globally unique identifier (GUID) or other suitable identifier. It should be appreciated that compute device 100 may use any suitable techniques and/or mechanisms to transmit the application identifier to the controller 118. For example, in some embodiments, the application identifier may be transmitted over an out-of-band communication channel.

In block 324 of FIG. 4, the compute device 100 or, more particularly, the controller 118 determines whether to authorize activation of the I/O device 120 based on the security policy 212. In doing so, in block 326, the compute device 100 may retrieve the security policy 212 from the secure memory 126 of the controller 118 or other suitable storage location. As described above, the security policy 212 may indicate whether one or more applications (e.g., software and/or firmware applications) are authorized to access the I/O device 120. For example, the security policy 212 may include a "blacklist" or "whitelist" of untrusted and trusted applications. In block 328, the compute device 100 may determine whether to authorize the activation based on a unique identifier of the application (e.g., based on a previously-determined GUID of the application) as described above. In some embodiments, in block 330, the compute device 100 may prompt the user of the compute device 100 for input regarding whether to allow the application to activate/access the I/O device 120. Further, in block 332, the compute device 100 may store the user's response to the security policy 212 for subsequent use.

If the compute device 100 determines, in block 334, to authorize activation of the I/O device 120, the method 300 advances to block 336 in which the compute device 100 allows the I/O device 120 to resume activation. In doing so, in block 338, the compute device 100 or, more particularly, the controller 118 may notify the I/O device 120 to resume activation via the GPIO pin 124 or another suitable out-of-band communication channel (e.g., a different out-of-band electrical connection between the controller 118 and the I/O device 120). For example, as described above, in some embodiments, the controller 118 may de-assert the GPIO pin 124, thereby indicating that the application is authorized to access/activate the I/O device 120.

If, however, the compute device 100 determines, in block 334, not to authorize activation of the I/O device 120, the method 300 advances to block 340 in which the compute device 100 prevents the I/O device 120 from resuming activation. In doing so, in block 340, the compute device 100 or, more particularly, the controller 118 may notify the I/O device 120 not to resume activation via the GPIO pin 124 or another suitable out-of-band communication channel. For example, in some embodiments, the controller 118 may fail to de-assert the GPIO pin 124 for at least a threshold period of time, thereby indicating that the application is unauthorized to access/activate the I/O device 120. More specifically, in some embodiments, the compute device 100 may utilize a timer or other suitable mechanism/logic to track the amount of time that has lapsed since the assertion of the GPIO pin 124. It should be appreciated that, in some embodiments, if the compute device 100 is operating in a low-power state and the controller 118 has not determined that the application is authorized to access the I/O device 120 by virtue of the security policy 212 and/or user input within a threshold period of time, the controller 118 may automatically prevent access to the I/O device 120. Further, in block 346, the compute device 100 may provide an error message to the application that prompted the attempt to activate the I/O device 120 indicating the activation failure.

As described above, in some embodiments, the controller 118 and the I/O device 120 are physically routed via an electrical connection to a GPIO pin 124 and logic understands the different states of the GPIO pin 124. For example, in some embodiments, the current or voltage of the GPIO pin 124 is driven high (i.e., the GPIO pin 124 is asserted) when the corresponding I/O device 120 is activated or accessed and maintained low otherwise. Of course, the signal amplitudes that constitute "high" or "low" values may vary depending on the particular embodiment. In the illustrative embodiment, the controller 118 senses that the voltage or current of the GPIO pin 124 is high, and performs the techniques described above. In particular, the controller 118 determines whether the application is authorized to access the particular I/O device 120 based on the security policy 212. In doing so, the controller 118 may utilize an out-of-band communication channel (e.g., a graphic/audio or other I/O channel) to communicate with the user regarding whether to permit the application to access the I/O device 120. For example, the compute device 100 may display content on a display and retrieve input from the user without interaction of the OS of the compute device 100. As such, it should be appreciated that, in some embodiments, the controller 118 includes its own software stack, its own operating system, and other out-of-context features. If the controller 118 determines the application is authorized to access the I/O device 120, in some embodiments, the controller 118 may de-assert the GPIO pin 124. That is, the controller 118 may drive the current or voltage of the GPIO pin 124 to a low value. However, if the controller 118 determines that the application is not authorized to access the I/O device 120, the controller 118 may fail to de-assert the GPIO pin 124 (i.e., maintain the signal at a high value). If a threshold period of time passes without the GPIO pin 124 being de-asserted, the I/O device 120 may interpret the failure to de-assert as an indication that access/activation by the application is unauthorized. Of course, it should be appreciated that the compute device 100 may utilize any other suitable techniques and/or mechanisms to perform the functions described herein.

It should be appreciated that, in some embodiments, the method 300 may be embodied as various instructions stored on a computer-readable media, which may be executed by the processor 110, the controller 118, the I/O devices 120, and/or other components of the compute device 100 to cause the compute device 100 to perform the method 300. The computer-readable media may be embodied as any type of media capable of being read by the compute device 100 including, but not limited to, the memory 114, the data storage 116, other memory or data storage devices of the compute device 100, and/or other suitable media.

EXAMPLES

Illustrative examples of the technologies disclosed herein are provided below. An embodiment of the technologies may include any one or more, and any combination of, the examples described below.

Example 1 includes a compute device for secure input/output device activation, the compute device comprising a controller; an input/output device; a monitoring module to identify an attempt to activate the input/output device; a notification module to notify the controller of the attempt to activate the input/output device via a communication channel that is out-of-band relative to an operating system of the compute device; and a policy management module to (i) determine whether to authorize activation of the input/output device based on a security policy, wherein the security policy indicates whether one or more applications are authorized to access the input/output device, and (ii) allow the input/output device to resume activation in response to a determination that the security policy authorizes the activation.

Example 2 includes the subject matter of Example 1, and wherein the input/output device is to identify the attempt to activate the input/output device.

Example 3 includes the subject matter of any of Examples 1 and 2, and further including an out-of-band electrical connection between the controller and the input/output device; and wherein to notify the controller comprises to notify the controller via the out-of-band electrical connection.

Example 4 includes the subject matter of any of Examples 1-3, and further including a general purpose input/output (GPIO) pin electrically coupled to the controller and the input/output device; and wherein to notify the controller comprises to notify the controller via the GPIO pin.

Example 5 includes the subject matter of any of Examples 1-4, and wherein to notify the controller via the GPIO pin comprises to assert the GPIO pin.

Example 6 includes the subject matter of any of Examples 1-5, and wherein to allow the input/output device to resume activation comprises to notify the input/output device to resume activation via the GPIO pin.

Example 7 includes the subject matter of any of Examples 1-6, and wherein to notify the input/output device to resume activation via the GPIO pin comprises to de-assert the GPIO pin.

Example 8 includes the subject matter of any of Examples 1-7, and wherein the policy management module is further to prevent the input/output device from resuming activation in response to a determination that the security policy does not authorize the activation.

Example 9 includes the subject matter of any of Examples 1-8, and wherein to prevent the input/output device from resuming activation comprises to notify the input/output device not to resume activation via the GPIO pin.

Example 10 includes the subject matter of any of Examples 1-9, and wherein to notify the input/output device not to resume activation via the GPIO pin comprises to fail to de-assert the GPIO pin for at least a threshold period of time.

Example 11 includes the subject matter of any of Examples 1-10, and wherein the policy management module is further to provide an error message to an application that prompted the attempt to activate the input/output device, wherein the error message indicates a failure to activate the input/output device.

Example 12 includes the subject matter of any of Examples 1-11, and wherein to notify the controller comprises to notify the controller of an application that prompted the attempt to activate the input/output device.

Example 13 includes the subject matter of any of Examples 1-12, and wherein to notify the controller of the application that prompted the attempt to activate the input/output device comprises to determine a unique identifier of the application.

Example 14 includes the subject matter of any of Examples 1-13, and wherein the unique identifier of the application comprises a globally unique identifier (GUID) of the application.

Example 15 includes the subject matter of any of Examples 1-14, and wherein to determine whether to authorize activation of the input/output device comprises to determine whether to authorize activation of the input/output device based on the unique identifier of the application.

Example 16 includes the subject matter of any of Examples 1-15, and wherein to determine whether to authorize activation of the input/output device comprises to retrieve the security policy from a secure memory of the compute device.

Example 17 includes the subject matter of any of Examples 1-16, and wherein to determine whether to authorization activation of the input/output device comprises to prompt a user of the compute device for input regarding the activation of the input/output device.

Example 18 includes the subject matter of any of Examples 1-17, and wherein the policy management module is further to save a response of the user to the security policy.

Example 19 includes the subject matter of any of Examples 1-18, and wherein the input/output device is one of a camera or a microphone.

Example 20 includes the subject matter of any of Examples 1-19, and wherein the input/output device is an audio output device.

Example 21 includes a method for secure activation of an input/output device of a compute device, the method comprising identifying, by the compute device, an attempt to activate the input/output device; notifying, by the compute device, a controller of the compute device of the attempt to activate the input/output device via a communication channel that is out-of-band relative to an operating system of the compute device; determining, by the controller, whether to authorize activation of the input/output device based on a security policy, wherein the security policy indicates whether one or more applications are authorized to access the input/output device; and allowing, by the compute device, the input/output device to resume activation in response to a determination that the security policy authorizes the activation.

Example 22 includes the subject matter of Example 21, and wherein identifying the attempt to activate the input/output device comprises identifying, by the input/output device, the attempt to activate the input/output device.

Example 23 includes the subject matter of any of Examples 21 and 22, and wherein notifying the controller comprises notifying the controller via an out-of-band electrical connection between the controller and the input/output device.

Example 24 includes the subject matter of any of Examples 21-23, and wherein notifying the controller comprises notifying the controller via a general purpose input/output (GPIO) pin of the compute device, wherein the controller and the input/output device are electrically coupled to the GPIO pin.

Example 25 includes the subject matter of any of Examples 21-24, and wherein notifying the controller via the GPIO pin comprises asserting the GPIO pin.

Example 26 includes the subject matter of any of Examples 21-25, and wherein allowing the input/output device to resume activation comprises notifying the input/output device to resume activation via the GPIO pin.

Example 27 includes the subject matter of any of Examples 21-26, and wherein notifying the input/output device to resume activation via the GPIO pin comprises de-asserting the GPIO pin.

Example 28 includes the subject matter of any of Examples 21-27, and further including preventing, by the compute device, the input/output device from resuming activation in response to a determination that the security policy does not authorize the activation.

Example 29 includes the subject matter of any of Examples 21-28, and wherein preventing the input/output device from resuming activation comprises notifying the input/output device not to resume activation via the GPIO pin.

Example 30 includes the subject matter of any of Examples 21-29, and wherein notifying the input/output device not to resume activation via the GPIO pin comprises failing to de-assert the GPIO pin for at least a threshold period of time.

Example 31 includes the subject matter of any of Examples 21-30, and further including providing, by the compute device, an error message to an application that prompted the attempt to activate the input/output device, wherein the error message indicates a failure to activate the input/output device.

Example 32 includes the subject matter of any of Examples 21-31, and wherein notifying the controller comprises notifying the controller of an application that prompted the attempt to activate the input/output device.

Example 33 includes the subject matter of any of Examples 21-32, and wherein notifying the controller of the application that prompted the attempt to activate the input/output device comprises determining a unique identifier of the application.

Example 34 includes the subject matter of any of Examples 21-33, and wherein the unique identifier of the application comprises a globally unique identifier (GUID) of the application.

Example 35 includes the subject matter of any of Examples 21-34, and wherein determining whether to authorize activation of the input/output device comprises determining whether to authorize activation of the input/output device based on the unique identifier of the application.

Example 36 includes the subject matter of any of Examples 21-35, and wherein determining whether to authorize activation of the input/output device comprises retrieving the security policy from a secure memory of the compute device.

Example 37 includes the subject matter of any of Examples 21-36, and wherein determining whether to authorization activation of the input/output device comprises prompting a user of the compute device for input regarding the activation of the input/output device.

Example 38 includes the subject matter of any of Examples 21-37, and further including saving, by the compute device, a response of the user to the security policy.

Example 39 includes the subject matter of any of Examples 21-38, and wherein the input/output device is one of a camera or a microphone.

Example 40 includes the subject matter of any of Examples 21-39, and wherein the input/output device is an audio output device.

Example 41 includes a computing device comprising a processor; and a memory having stored therein a plurality of instructions that when executed by the processor cause the computing device to perform the method of any of claims 21-40.

Example 42 includes one or more machine-readable storage media comprising a plurality of instructions stored thereon that in response to being executed result in a computing device performing the method of any of claims 21-40.

Example 43 includes a computing device comprising means for performing the method of any of claims 21-40.

Example 44 includes a compute device for secure input/output device activation, the computing device comprising means for identifying an attempt to activate the input/output device; means for notifying a controller of the compute device of the attempt to activate the input/output device via a communication channel that is out-of-band relative to an operating system of the compute device; means for determining whether to authorize activation of the input/output device based on a security policy, wherein the security policy indicates whether one or more applications are authorized to access the input/output device; and means for allowing the input/output device to resume activation in response to a determination that the security policy authorizes the activation.

Example 45 includes the subject matter of Example 44, and wherein the means for identifying the attempt to activate the input/output device comprises means for identifying, by the input/output device, the attempt to activate the input/output device.

Example 46 includes the subject matter of any of Examples 44 and 45, and wherein the means for notifying the controller comprises means for notifying the controller via an out-of-band electrical connection between the controller and the input/output device.

Example 47 includes the subject matter of any of Examples 44-46, and wherein the means for notifying the controller comprises means for notifying the controller via a general purpose input/output (GPIO) pin of the compute device, wherein the controller and the input/output device are electrically coupled to the GPIO pin.

Example 48 includes the subject matter of any of Examples 44-47, and wherein the means for notifying the controller via the GPIO pin comprises means for asserting the GPIO pin.

Example 49 includes the subject matter of any of Examples 44-48, and wherein the means for allowing the input/output device to resume activation comprises means for notifying the input/output device to resume activation via the GPIO pin.

Example 50 includes the subject matter of any of Examples 44-49, and wherein the means for notifying the input/output device to resume activation via the GPIO pin comprises means for de-asserting the GPIO pin.

Example 51 includes the subject matter of any of Examples 44-50, and further including means for preventing the input/output device from resuming activation in response to a determination that the security policy does not authorize the activation.

Example 52 includes the subject matter of any of Examples 44-51, and wherein the means for preventing the input/output device from resuming activation comprises means for notifying the input/output device not to resume activation via the GPIO pin.

Example 53 includes the subject matter of any of Examples 44-52, and wherein the means for notifying the input/output device not to resume activation via the GPIO pin comprises means for failing to de-assert the GPIO pin for at least a threshold period of time.

Example 54 includes the subject matter of any of Examples 44-53, and further including means for providing an error message to an application that prompted the attempt to activate the input/output device, wherein the error message indicates a failure to activate the input/output device.

Example 55 includes the subject matter of any of Examples 44-54, and wherein the means for notifying the controller comprises means for notifying the controller of an application that prompted the attempt to activate the input/output device.

Example 56 includes the subject matter of any of Examples 44-55, and wherein the means for notifying the controller of the application that prompted the attempt to activate the input/output device comprises means for determining a unique identifier of the application.

Example 57 includes the subject matter of any of Examples 44-56, and wherein the unique identifier of the application comprises a globally unique identifier (GUID) of the application.

Example 58 includes the subject matter of any of Examples 44-57, and wherein the means for determining whether to authorize activation of the input/output device comprises means for determining whether to authorize activation of the input/output device based on the unique identifier of the application.

Example 59 includes the subject matter of any of Examples 44-58, and wherein the means for determining whether to authorize activation of the input/output device comprises means for retrieving the security policy from a secure memory of the compute device.

Example 60 includes the subject matter of any of Examples 44-59, and wherein the means for determining whether to authorization activation of the input/output device comprises means for prompting a user of the compute device for input regarding the activation of the input/output device.

Example 61 includes the subject matter of any of Examples 44-60, and further including means for saving a response of the user to the security policy.

Example 62 includes the subject matter of any of Examples 44-61, and wherein the input/output device is one of a camera or a microphone.

Example 63 includes the subject matter of any of Examples 44-62, and wherein the input/output device is an audio output device.

The invention claimed is:

1. A compute device for secure input/output device activation, the compute device comprising:
    a processor to execute an operating system of the compute device;
    a hardware controller;
    an input/output device;
    a monitoring module to identify an attempt to activate the input/output device;
    a notification module to notify the hardware controller of the attempt to activate the input/output device via a communication channel that is out-of-band relative to the operating system of the compute device; and
    a policy management module to (i) determine, by the hardware controller in response to a notification of the attempt to activate the input/output device, whether to authorize activation of the input/output device based on a security policy, wherein the security policy indicates whether one or more applications are authorized to access the input/output device, and (ii) allow the input/output device to resume activation in response to a determination that the security policy authorizes the activation.

2. The compute device of claim 1, wherein the input/output device is to identify the attempt to activate the input/output device.

3. The compute device of claim 1, further comprising an out-of-band electrical connection between the hardware controller and the input/output device; and
    wherein to notify the hardware controller comprises to notify the hardware controller via the out-of-band electrical connection.

4. The compute device of claim 1, further comprising a general purpose input/output (GPIO) pin electrically coupled to the hardware controller and the input/output device; and
    wherein to notify the hardware controller comprises to notify the hardware controller via the GPIO pin.

5. The compute device of claim 4, wherein to notify the hardware controller via the GPIO pin comprises to assert the GPIO pin.

6. The compute device of claim 4, wherein to allow the input/output device to resume activation comprises to notify the input/output device to resume activation via the GPIO pin.

7. The compute device of claim 6, wherein to notify the input/output device to resume activation via the GPIO pin comprises to de-assert the GPIO pin.

8. The compute device of claim 4, wherein the policy management module is further to prevent the input/output device from resuming activation in response to a determination that the security policy does not authorize the activation.

9. The compute device of claim 8, wherein to prevent the input/output device from resuming activation comprises to notify the input/output device not to resume activation via the GPIO pin.

10. The compute device of claim 9, wherein to notify the input/output device not to resume activation via the GPIO pin comprises to fail to de-assert the GPIO pin for at least a threshold period of time.

11. The compute device of claim 8, wherein the policy management module is further to provide an error message to an application that prompted the attempt to activate the input/output device, wherein the error message indicates a failure to activate the input/output device.

12. The compute device of claim 1, wherein to notify the hardware controller comprises to notify the hardware controller of an application that prompted the attempt to activate the input/output device.

13. The compute device of claim 12, wherein to notify the hardware controller of the application that prompted the attempt to activate the input/output device comprises to determine a unique identifier of the application.

14. The compute device of claim 13, wherein the unique identifier of the application comprises a globally unique identifier (GUID) of the application.

15. The compute device of claim 13, wherein to determine whether to authorize activation of the input/output device comprises to determine whether to authorize activation of the input/output device based on the unique identifier of the application.

16. One or more non-transitory, machine-readable storage media comprising a plurality of instructions stored thereon that, in response to execution by a compute device, causes the compute device to:
    identify an attempt to activate the input/output device;

notify a hardware controller of the compute device of the attempt to activate the input/output device via a communication channel that is out-of-band relative to an operating system of the compute device, wherein the operating system is executed by a processor of the compute device;

determine, by the hardware controller in response to a notification of the attempt to activate the input/output device, whether to authorize activation of the input/output device based on a security policy, wherein the security policy indicates whether one or more applications are authorized to access the input/output device; and allow the input/output device to resume activation in response to a determination that the security policy authorizes the activation.

17. The one or more non-transitory, machine-readable storage media of claim 16, wherein to notify the hardware controller comprises to notify the hardware controller via a general purpose input/output (GPIO) pin of the compute device, wherein the hardware controller and the input/output device are electrically coupled to the GPIO pin.

18. The one or more non-transitory, machine-readable storage media of claim 17, further comprising a plurality of instructions stored thereon that, in response to execution by the compute device, causes the compute device to prevent the input/output device from resuming activation in response to a determination that the security policy does not authorize the activation.

19. The one or more non-transitory, machine-readable storage media of claim 18, wherein to prevent the input/output device from resuming activation comprises to notify the input/output device not to resume activation via the GPIO pin.

20. The one or more non-transitory, machine-readable storage media of claim 19, wherein to notify the input/output device not to resume activation via the GPIO pin comprises to fail to de-assert the GPIO pin for at least a threshold period of time.

21. The one or more non-transitory, machine-readable storage media of claim 18, further comprising a plurality of instructions stored thereon that, in response to execution by the compute device, causes the compute device to provide an error message to an application that prompted the attempt to activate the input/output device, wherein the error message indicates a failure to activate the input/output device.

22. A method for secure activation of an input/output device of a compute device, the method comprising:

identifying, by the compute device, an attempt to activate the input/output device;

notifying, by the compute device, a hardware controller of the compute device of the attempt to activate the input/output device via a communication channel that is out-of-band relative to an operating system of the compute device, wherein the operating system is executed by a processor of the compute device;

determining, by the hardware controller in response to notifying the hardware controller of the attempt to activate the input/output device, whether to authorize activation of the input/output device based on a security policy, wherein the security policy indicates whether one or more applications are authorized to access the input/output device; and allowing, by the compute device, the input/output device to resume activation in response to a determination that the security policy authorizes the activation.

23. The method of claim 22, wherein notifying the hardware controller comprises notifying the hardware controller of an application that prompted the attempt to activate the input/output device.

24. The method of claim 22, wherein determining whether to authorization activation of the input/output device comprises prompting a user of the compute device for input regarding the activation of the input/output device; and further comprising saving, by the compute device, a response of the user to the security policy.

25. The method of any of claim 22, wherein the input/output device is one of a camera, a microphone, or an audio output device.

* * * * *